United States Patent [19]
Iwaki

[11] Patent Number: 5,671,041
[45] Date of Patent: Sep. 23, 1997

[54] EXPOSURE CONTROL METHOD AND APPARATUS FOR PHOTOGRAPHIC PRINTER

[75] Inventor: Yasuharu Iwaki, Kanagawa, Japan

[73] Assignee: Fuji Photo Film Co., Ltd., Kanagawa, Japan

[21] Appl. No.: 402,373

[22] Filed: Mar. 13, 1995

[30] Foreign Application Priority Data

Apr. 15, 1994 [JP] Japan .................................. 6-077569

[51] Int. Cl.⁶ ............................................... G03B 27/80
[52] U.S. Cl. ............................................... 355/38; 355/77
[58] Field of Search .................................. 355/35, 38, 67, 355/68, 77

[56] References Cited

U.S. PATENT DOCUMENTS

| | | | |
|---|---|---|---|
| 4,769,695 | 9/1988 | Terashita | 355/38 X |
| 4,809,198 | 2/1989 | Terashita | 355/35 X |
| 4,974,017 | 11/1990 | Terashita | 355/38 |
| 4,999,668 | 3/1991 | Suzuki et al. | 355/38 |

FOREIGN PATENT DOCUMENTS 4368933  12/1992  Japan .

*Primary Examiner*—Fred L. Braun
*Attorney, Agent, or Firm*—Sughrue, Mion, Zinn, Macpeak & Seas, PLLC

[57] ABSTRACT

A photographic printer has yellow, magenta and cyan color-correcting filters, which are inserted in a light source and a developed photographic film. A frame to be printed is measured photometrically in three-color separation to obtain optical density of three primary colors. Positions for setting the filters in a light path are controlled according to the density. The frame is printed by the printing light on color photographic paper. Data of plural density domains, dividing a three-dimensional density space, are preset. The density space is defined by coordinates on which the density of the three primary colors is taken. Data of matrix elements are stored in association respectively with the density domains. One of the density domains is selected in accordance with the density obtained from the frame. Matrix elements associated with the selected density domain are selected from the matrix elements. Matrix operation is executed in accordance with the obtained density and the selected matrix elements, for obtaining a filter position at which three-color components of printing light from the light source is optimized.

23 Claims, 9 Drawing Sheets

— C FILTER
– – – M FILTER
- - - - Y FILTER

FULLY
CLOSED

FULLY
OPEN

EXPOSURE CONTROL METHOD AND APPARATUS FOR PHOTOGRAPHIC PRINTER

BACKGROUND OF THE INVENTION

1. Field of the Invention

The present invention relates to an exposure control method for a photographic printer. More particularly, the present invention relates to an exposure control method in which a quality of printing light in a photographic printer can be adjusted with high precision when color-correcting filters are set in a path of the printing light.

2. Description Related to the Prior Art

There is a photographic printer of a light-adjustable type, in which a light quality adjusting section is disposed between a light source and a developed negative film to be used for the printing. In the light quality adjusting section, Cyan, Magenta and Yellow color-correcting filters are inserted in a printing light path. Positions (inserting amounts) where the filters are set are changed, to adjust the proportion and intensity of the three-color components of the printing light, so that the light quality is adjusted.

In the photographic printer of the foregoing example, the filters are set in positions determined for measurement, before light of each color transmitted through a negative frame is measured photometrically by a photo receptor. Illuminance of each color measured by the photo receptor is logarithmically converted into optical density, on the basis of which an appropriate exposure amount for printing is calculated. Correcting data, if necessitated, are manually inputted to the printer, and used for correcting the exposure amount. Light amounts of the colors are determined in accordance with the exposure amount. In consideration of the light amounts, the filters are set in the light path, to adjust the proportion and intensity of the Red, Green and Blue components of the printing light. In general, there is a non-linear relationship between the filter positions and the printing light intensity. Great difficulties lie in precisely determining the filter positions in view of light adjustment as desired.

The three-color density R, G and B of a negative frame as illuminated has a logarithmically converted form. To simplify a relationship between the density and filter positions at which the printing light is adjusted, it would be possible to conceive filters F1 and F2 as illustrated in FIGS. 14A, 14B and 14C, in which an area of a filter opening OA is changed in exponential fashion with reference to a straight shifting amount (filter position) of the filters F1 and F2. Referenced by LW is an aperture defined across the printing light path. The filter position would be given a proportional relationship with the filter positions. However it is highly difficult to produce such filters with the exponential curves formed with sufficient precision. Note that in FIG. 14A the filters F1 and F2 has a middle position or a position slightly shifted in an open direction from the middle position. FIG. 14B illustrates a fully closed position of the filters F1 and F2. FIG. 14C illustrates their fully open position.

Ideally each of the color-correcting filters should absorb (or reflect) light of one associated primary color solely and completely: for example, a Cyan filter should absorb (or reflect) all of the Red light and should transmit all of the Green and Blue light. However a general Cyan filter transmits Red light more than 0%, and transmits Green and Blue light less than 100% (unwanted absorption) as illustrated in FIG. 3A. When the filter position of the Cyan filter is changed, the transmittance to the Green and Blue light is changed at a small amount inevitably with the transmittance to the Red light. The same problem applies to the Magenta and Yellow filters. The light transmittance to a single primary color cannot be adjusted by a simple movement of the associated filter.

There is a further problem in that light is reflected by each filter at small amounts in leaked fashion. The leaked light is reflected plural times between the filters, so as to cause apparent changes in transmittance. Such unwanted effects vary, depending upon various positions of the filters.

Even if the filters ideally have a spectral characteristic of a rectangularly shaped distribution to absorb (or reflect) light of only one color, it is yet difficult for the filters to pass the light flux from the light source completely in parallel. An apparent spectral transmittance of the filters is given a dull feature due to dependency to an incident angle. There occurs a shift in the wavelength. It is impossible independently to change light of each single color.

The filter positions where the filters are set affect the intensity of Red, Green and Blue components of the printing light in interaction between the colors. The density Gr, Gg and Gb of the negative frame illuminated by the Red, Green and Blue light have relationships with the filter positions Pc, Pm and Py as follows:

$Gr = u_r (Pc, Pm, Py)$
$Gg = u_g (Pc, Pm, Py)$
$Gb = u_b (Pc, Pm, Py)$

The density Gr, Gg and Gb is a non-linear function $u$ of the filter positions Pc, Pm and Py.

In view of the non-linearity between Red, Green and Blue light intensity and filter positions, U.S. Pat. No. 4,999,668 discloses a use of a calibration curve produced by photometry in shifting the three filters in equal positions. The relationships between the three-color density and the filter positions are converted by use of the calibration curve in linearization. A matrix is determined through regression analysis, and used to execute matrix operation with a preset equation, to obtain adjusted filter positions.

There is another suggestion in JP-A (Japanese Patent Laid-open Publication No.) 4-368933, in which a table is produced by establishing relationships between points (C, M, Y) in a filter position space and points (R, G, B) in a light intensity space, and is previously stored in a look-up table memory (LUT), which is referred to for determining positions where the filters should be set.

However the method of U.S. Pat. No. 4,999,668 has a problem. The calibration curve for linearization, produced with common positions common between the three filters, is simply associated with the non-linear relationship between the three-color light intensity and the filter positions. When there is a great difference between the three filter positions, a relationship between the three-color light intensity and the filter positions after the linearization may be remarkably dissimilar from what the relationship properly should be.

In the method of JP-A 4-368933, the table is produced from the relationships between the three-color light and the filter positions for all combinations of three positions of the filters. Even though the light can be adjusted well precisely, there is a problem in that a memory with extremely great capacity is required.

SUMMARY OF THE INVENTION

In view of the foregoing problems, an object of the present invention is to provide an exposure control method in which a quality of printing light in a photographic printer can be adjusted with heightened precision.

Another object of the present invention is to provide an exposure control method in which precision in adjusting a quality of printing light in a photographic printer is prevented from being affected with the unwanted absorption of light in the filters.

In order to achieve the above and other objects and advantages of this invention, a photographic printer has yellow, magenta and cyan color-correcting filters, which are inserted in a light source and a developed photographic film. A frame to be printed is measured photometrically in three-color separation to obtain density of three primary colors. Positions for setting the filters in a light path are controlled according to the density. The frame is printed by the printing light on color photographic paper. Plural density domains, dividing a three-dimensional density space, are determined. The density space is defined by coordinates on which the density of the three primary colors is taken. Data of matrix elements are determined in association respectively with the density domains. One of the density domains is selected in accordance with the density of the frame. Matrix elements associated with the selected density domain are selected from the matrix elements. Matrix operation is executed in accordance with the density of the frame and the selected matrix elements, for obtaining the filter positions at which three-color components of printing light from the light source is optimized.

In a preferred embodiment, in obtaining the filter positions according to the obtained density, the filter positions are smoothed in a vicinity of a border where density domains are adjacent to the selected density domain, to render the filter positions in continued fashion between adjacent the density domains.

The printing light is measured photometrically while the filter positions of the three filters are separately shifted, to obtain first density. The first density is classified in association with respective the density domains. Respective combinations of the filter positions of the filters are associated with the first density and with the density domains associated with the first density. The matrix elements are determined for respective the density domains, through regression analysis in accordance with the first density.

To be precise, the printing light is measured photometrically while the three filters are shifted in a common filter position common to the three filters, to obtain second density. Points having coordinates of the second density and the common filter position are plotted in a coordinate system, to produce a calibration curve. The first density is converted into a virtual filter position by use of the calibration curve. The virtual filter position is classified in combination with the first density. The matrix elements are obtained in combination with the virtual filter position and the first density through the regression analysis.

The density has form of a gain value. The density of the gain value form is determined from Di, DNi and Bi in accordance with arithmetic operation and conversion to a linear area; wherein Di is the density of the frame; DNi is density obtained by measuring a normal control negative film; Bi is a filter position where the normal control negative film is finished in optimum fashion; and i is each of the three primary colors.

Referring to the operation of the above construction, FIG. 1 schematically illustrates an exposure control apparatus for a photographic printer. A photometric section 1 measures light from a frame to be printed in three-color separation. A density-convertor section 2 converts Red, Green and Blue illuminance measured by the photometric section 1 into photometric density. The photometric density is sent to a domain selector section 3 and a matrix operation arithmetic section 4. The domain selector section 3 evaluates the photometric density, and determines one of plural preset domains to which the photometric density belongs. A signal representing the selected domain is sent to a matrix element selector section 5, which selects matrix elements associated with the domain from among ones stored in a matrix element memory 8. The data of the selected matrix elements are sent to the matrix operation section 4.

The matrix operation section 4 executes a matrix operation in accordance with the matrix and the photometric density to obtain filter positions, data of which are sent to a smoothing section 6. The matrix operation section 4 further utilizes matrices associated with domains adjacent to the selected domain, to calculate auxiliary set positions, which would be defined if the photometric density were associated with the domains away from it. The smoothing section 6 calculates a weighted average of the auxiliary set positions, for a smoothing treatment of the filter position. An exposure control section 9 receives the filter position from the smoothing section 6, responsively sets the filters, and adjusts the printing light at optimum amounts, to take an exposure for printing a frame.

FIG. 2 illustrates circuitry of determining matrix elements. A filter drive section 10 inserts color-correcting filters of Cyan, Magenta and Yellow colors into a printing light path. A photometric section 11 measures a light amount of the printing light with the filters set in a plurality of filter positions, to obtain optical density of the printing light. A domain designating section 12 evaluates the photometric density, and determines one of plural preset domains to which the photometric density belongs. A density memory 13 stores various combinations of the photometric density and filter positions associated therewith for each of the domains. A matrix element determining section 14 produces a filter calibration curve by use of the photometric density and the filter positions received from the density memory 13. The matrix element determining section 14 then determines a virtual filter position associated with the photometric density by use of the calibration curve, and classifies the virtual filter position into the preset domains in accordance with grades of the photometric density. For each of the domains, matrix elements are produced by means of regression analysis. As described herein, a nonlinear model is transformed into a linear model through the regression analysis with the three-dimensional space divided into the domains. The division of the space reduces errors or residual in the regression analysis. It is possible to determine the filter positions of the filters with high precision. Note that the photometric section 1 in the photographic printer may be commonly used as photometric section 11 in the matrix element determining circuitry. The filter setting section included in the exposure control section 9 may be commonly used as filter drive section 10 of the matrix element determining circuitry. This common use makes it possible to simplify the construction of the apparatus.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
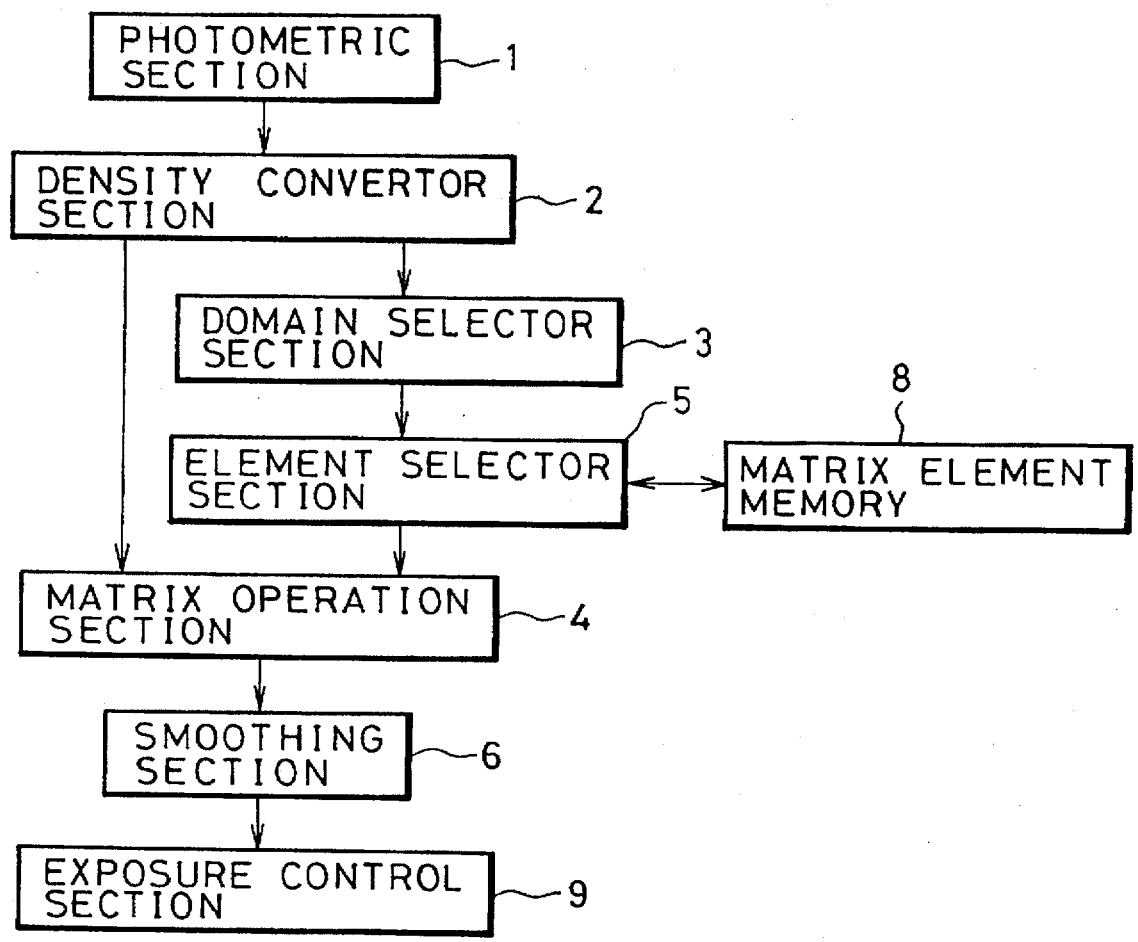
FIG. 1 is a block diagram schematically illustrating an exposure control apparatus for a photographic printer in the present invention.
Figure 2:
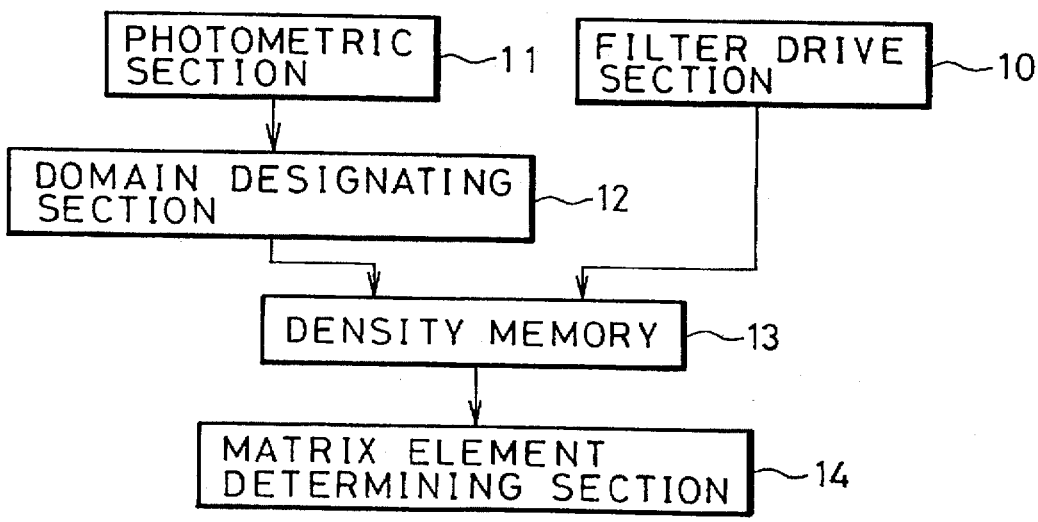
FIG. 2 is a block diagram schematically illustrating circuitry for determining matrix elements.
Figure 3:
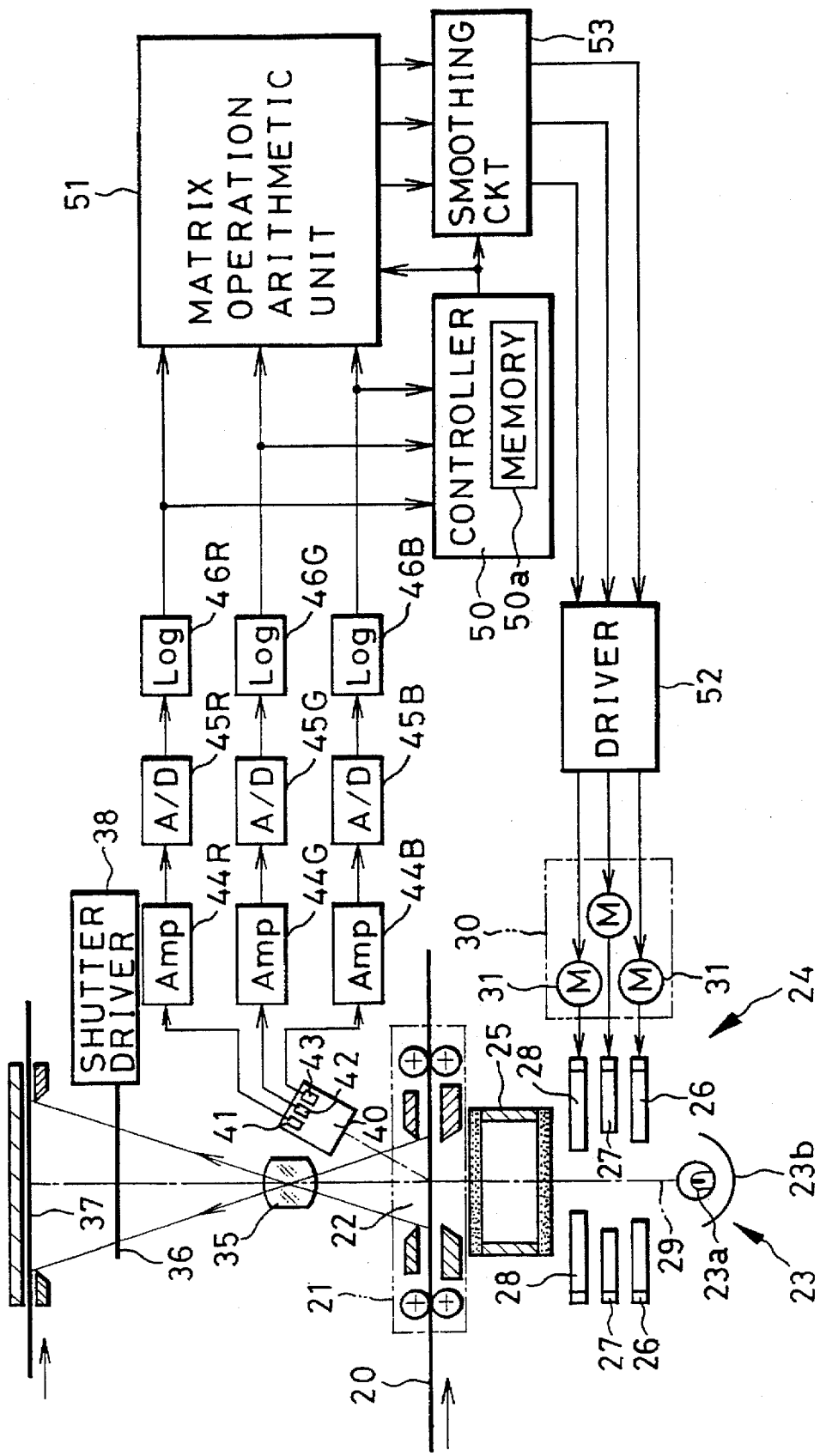
FIG. 3 is a block diagram illustrating the photographic printer.

In FIG. 3 illustrating a photographic printer, a developed negative film 20 is set on a film carrier 21. On the film carrier 21, each of the frames is moved to a mask opening 22, as is well known in the art. Under the film carrier 21, there are arranged a light source 23, a light quality adjusting section 24, and a diffusing box 25. The light source 23 consists of a lamp 23a emanating white light, and a reflector 23b.

A light quality adjusting section 24 includes color-correcting filters 26 to 28 of Yellow, Magenta and Cyan colors. The filters 26 to 28 can be moved between a fully closed position and a fully open position by a shifting mechanism 30. In the fully closed position, the filters 26 to 28 are inserted the most deeply into a printing light path 29. In the fully open position, the filters 26 to 28 are retracted away from the printing light path 29. The three filters 26 to 28 have characteristics depicted in FIG. 3A, in which Red, Green and Blue ranges represent ranges where a photo receptor 40 is spectrally sensitive to the Red, Green and Blue components of light. The shifting mechanism 30, as is well known in the art, has three stepping motors 31, which rotate to change the positions where the filters 26 to 28 are set. The diffuser box 25 diffuses the light from the light quality adjusting section 24, to illuminate a frame of the negative film 20 to be printed in homogeneous fashion. The printing light passed through the negative film 20 is passed through a printing lens 35, and comes incident on color photographic paper 37 while a shutter 36 is open, to expose the paper 37 to print an image from the negative film 20. The shutter 36 is opened/closed by a shutter driver 38.

In a position diagonally above the mask opening 22 for the negative frame to be printed, there is disposed the photo receptor 40, which includes a Red color photo sensor 41, a Green color photo sensor 42, and a Blue color photo sensor 43. Each of the sensors 41 to 43 performs photometry of the negative frame, to obtain an average transmittance density, for example a large area transmittance density (LATD). Each of the sensors 41 to 43 consists of a color filter and a photo cell known in the art, and photoelectrically converts the light of a wavelength range associated with the color filter. Signals generated from the sensors 41 to 43 are amplified by amplifier 44R, 44G and 44B, digitally converted by A/D converters 45R, 45G and 45B, and logarithmically converted by logarithmic convertors 46R, 46G and 46B into signals of the photometric density as a logarithmic value of a reciprocal of light intensity and in forms of a gain value. The signals are sent into a controller 50 and a matrix operation arithmetic unit 51. Note that, instead of the photo receptor 40 arranged diagonally above the negative frame, a photo receptor can be more simply arranged by use of a space effectively. With such a photo receptor, a half mirror or a half prism may be arranged for splitting the light from the negative frame in two directions, one toward the color paper and another toward the photo receptor. It is also possible to arrange a photo receptor upstream from the printing station of the film 20, to perform photometry before the printing station.

The controller 50, as known in the art, is constituted of a microcomputer. When the printer is in a printing mode, the controller 50 controls relevant circuits in accordance with a control sequence stored in a ROM. The controller 50 has various setup modes in addition to the printing mode. As far as the present invention concerns, there is a printing setup mode. To refer to this briefly, the printing setup mode has steps of: photometry for producing a filter calibration curve A3 (see FIG. 5), the production of the calibration curve A3 plotted through photometric density DNi such as R=ϕ(P), then the determination of virtual filter positions P'c=ϕ(θ0⁻¹(R)) or ϕ(θc⁻¹(R)), etc. associated with the photometric density R=θ0(Pc) or θc(Pc), etc., classification of the virtual filter position (P'c, P'm, P'y) into the domains in accordance with grades of the photometric density (R, G, B), and a linear approximation of a relationship between the photometric density (R, G, B) and the virtual filter position (P'c, P'm, P'y) by means of regression analysis. Those are described later in detail.

In the printing mode, the controller 50 determines a photometric gain value in accordance with the logarithmic form of the photometric density. The photometric gain value is sent to the matrix operation arithmetic unit 51. To determine the positions where to set the filters 26 to 28, the photometric gain value, by way of density, is used. In the present embodiment, printing exposure time, during which the shutter for the color paper is set open, is determined constant for appropriately exposed negative frames created by a camera. The photometric gain value corresponds to the exposure amount by way of illuminance integrated with respect to time. The controller 50, according to the calculated photometric gain value, selects a matrix associated with a domain where the photometric gain value is located. Data of the selected matrix is sent to the matrix operation arithmetic unit 51. The matrix elements are previously determined in the printing setup mode for each of the domains in accordance with grades of the gain value, and are stored in the memory 50a of the controller 50.

Note that, in spite of the fixed exposure time above, it is preferable to set the printing exposure time longer for a remarkably under-exposure frame, and shorter for a remarkably over-exposure frame.

The matrix operation arithmetic unit 51 uses the selected matrix elements, and executes the matrix operation according to Equation (1) with the photometric density, to obtain virtual filter positions P'c, P'm and P'y, the signals of which are sent to a driver 52. The driver 52 generates drive pulses in a number associated with the virtual filter position signals. The drive pulses rotate the motor 31, which adjust the positions of the filters 26 to 28, to correct the colors.

$$\begin{bmatrix} P'c \\ P'm \\ P'y \end{bmatrix} = \begin{bmatrix} a_{11} & a_{12} & a_{13} & \delta c \\ a_{21} & a_{22} & a_{23} & \delta m \\ a_{31} & a_{32} & a_{33} & \delta y \end{bmatrix} \begin{bmatrix} Gr \\ Gg \\ Gb \\ 1 \end{bmatrix} \quad (1)$$

where $a_{11}$ to $a_{33}$, $\delta c$, $\delta m$ and $\delta y$ are elements obtained through regression analysis;

Gr, Gg and Gb are photometric density of Red, Green and Blue in forms of gain values; and P'c, P'm and P'y are virtual filter positions into which the positions of setting the Cyan, Magenta and Yellow filters 26 to 28 are converted through the calibration curve.

There is a smoothing circuit 53 connected between the matrix operation arithmetic circuit 51 and the driver 52. The smoothing circuit 53 uses representative points located in the respective domains, and calculates a weighted average of auxiliary set positions with weights in consideration of distances of the representative points from the virtual filter position (P'c, P'm, P'y), so as to send a signal of the weighted average to the driver 52 as smoothed filter positions. The smoothing circuit 53 is described later in detail.

The controller 50 causes the photo receptor 40 to measure the negative frame photometrically, and determines the gain value from the photometric density. In the printing setup mode, the three-dimensional density space is divided into plural domains. Elements of matrices for approximating non-linearity to linearity are obtained for each domain through the regression analysis. The matrix elements are stored in the memory 50a.

The determination of the matrix elements in the printing setup mode is described now. The Cyan, Magenta and Yellow filters 26 to 28 are set in positions Pc, Pm and Py. Let Gr, Gg and Gb be three-color photometric density of the printing light adjusted in association with the filter positions Pc, Pm and Py. The filters 26 to 28 are driven by the stepping motors 31. The positions of the filters 26 to 28 are represented by numbers of the drive pulses. When "zero" pulse is supplied, each of the filters is given the above-described fully closed position. When "800" pulses are supplied, each filter is given the fully open position.

Figure 3A:
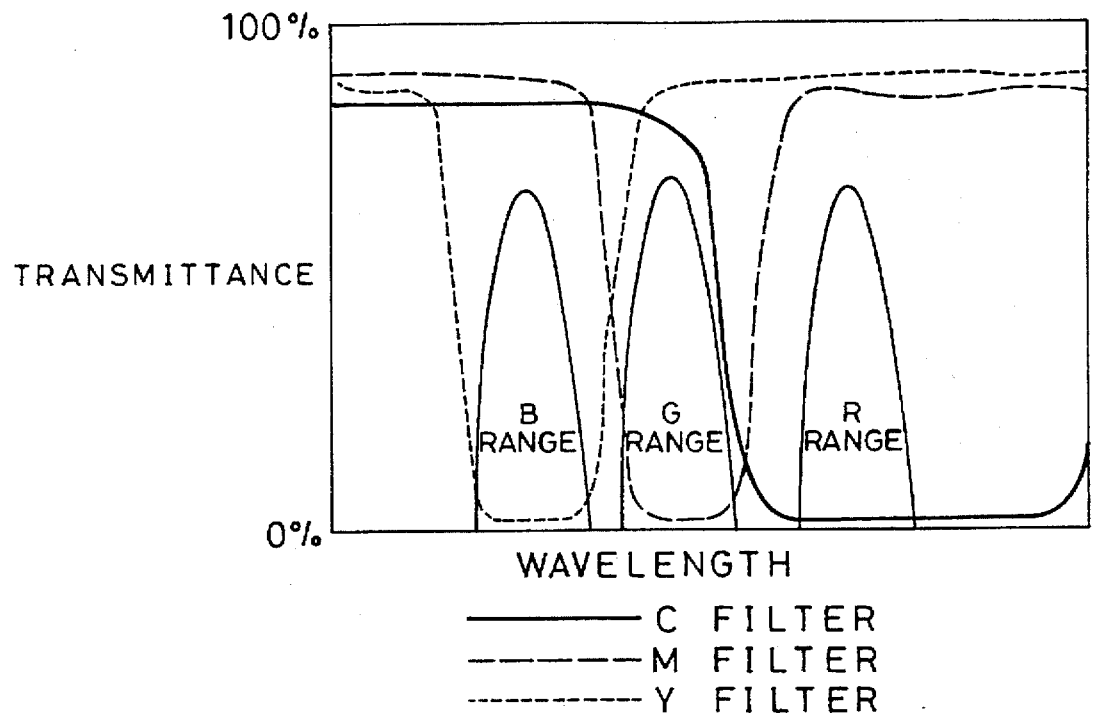
FIG. 3A is a graph illustrating spectral sensitivity of a photo receptor and spectral transmittance of color-correcting filters.
Figure 14A:
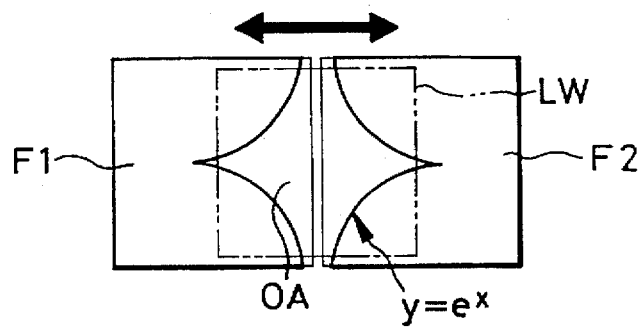
FIG. 14A is an explanatory view in plan, illustrating color-correcting filters having exponential curves according to the prior art.
Figure 14B:
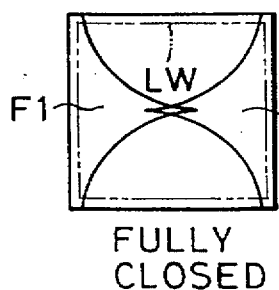
FIG. 14B is an explanatory view in plan, illustrating the filters of FIG. 14A and fully closed.
Figure 14C:
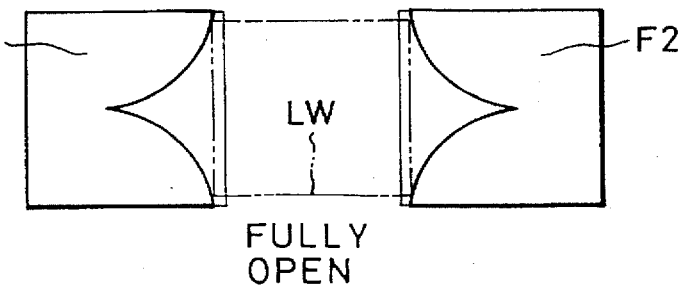
FIG. 14C is an explanatory view in plan, illustrating the filters of FIGS. 14A and 14B and fully open.

With the Yellow and Magenta filters 26 and 27 kept fully closed, the Cyan filter 28 is moved, while the printing light is measured photometrically. The Red color density $R=\theta 0$ (Pc), as depicted with the curve A1 of FIG. 4, comes the maximum when the Cyan filter 28 is fully closed, and is decreased according as the Cyan filter 28 is being retracted from the printing light path. Then the printing light is measured in another way, with the Yellow and Magenta filters 26 and 27 kept fully open and while the Cyan filter 28 is moved. The Red color density $R=\theta c(Pc)$, as depicted with the curve A2 of FIG. 4, comes the maximum when the Cyan filter 28 is fully closed, and is decreased according as the Cyan filter 28 is being retracted. However the curve A2 is unequal from the curve A1, because the Yellow and Magenta filters 26 and 27 also cut the Red color light to a small extent as illustrated in FIG. 3A. The Red density $R=\theta c(Pc)$ of the curve A2 is greater than $R=\theta 0(Pc)$ of the curve A1.

Figure 4:
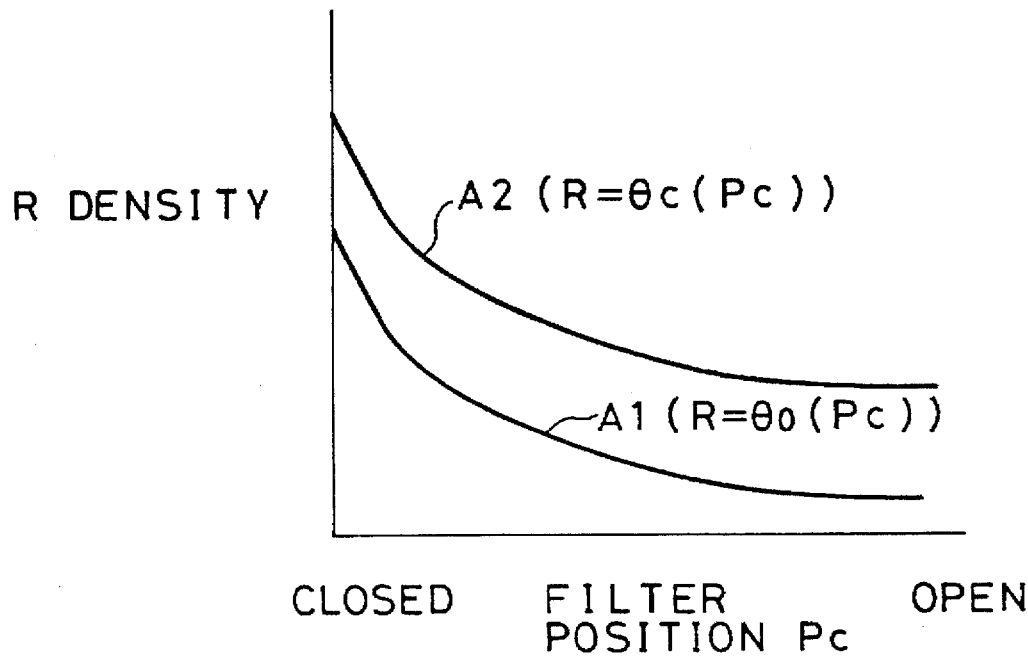
FIG. 4 is a graph illustrating relationships between a Cyan filter position and Red density of printing light, as plotted with the Magenta and Yellow filters stopped.
Figure 5:
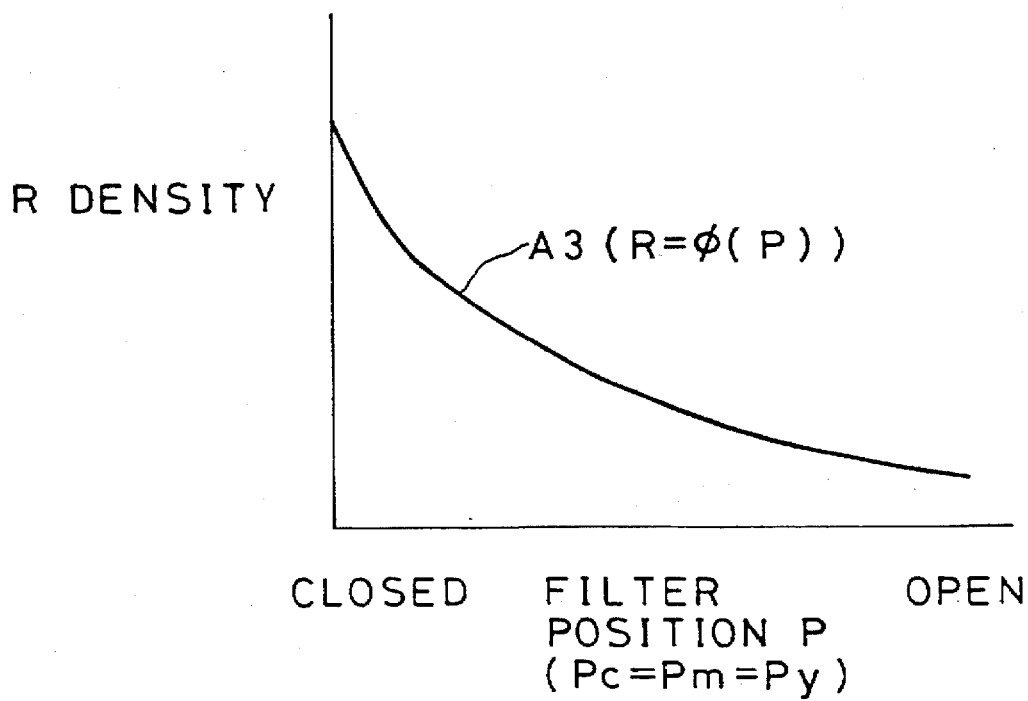
FIG. 5 is a graph illustrating a calibration curve plotted from Cyan filter position and the Red density, with the Magenta and Yellow filters shifted equally to the Cyan filter.
Figure 6:
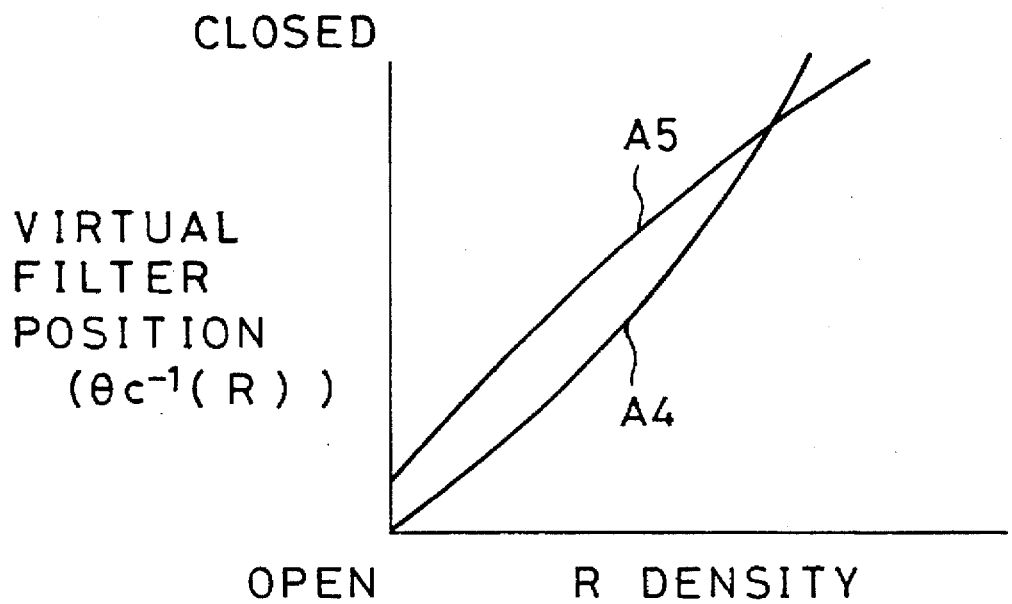
FIG. 6 is a graph illustrating sets of points into which the relationships in FIG. 4 are converted by use of the calibration curve.
Figure 7:
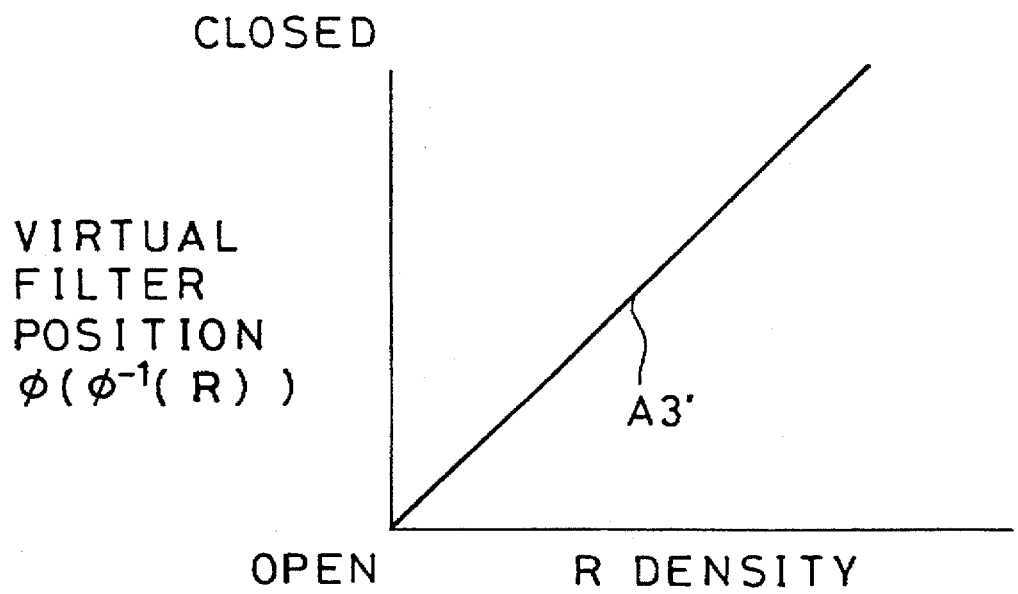
FIG. 7 is a graph illustrating a set of points into which the calibration curve is converted by use of itself.

A Red density $R=\phi(P)$ as DNi is measured with the filters 26 to 28 moved while keeping their filter positions P equal. The Red density $R=\phi(P)$ comes the highest in the fully closed position as illustrated in FIG. 5. According as the filters 26 to 28 come toward the fully open position, the Red density $R=\phi(P)$ decreases. The curve A3 in FIG. 5 is referred to as calibration curve. To linearize the nonlinear characteristics, the calibration curve A3 is used to convert the filter position Pc into the virtual filter position P'c. The curves A1 and A2 of FIG. 4 are converted through the calibration curve A3 into point sets A4 and A5 as new curves $P'c=\phi(\theta 0^{-1}(R))$ and $P'c=\phi(\theta c^{-1}(R))$ in FIG. 6. Naturally the calibration curve A3 can be converted by itself into straight line A3' passing the origin of the coordinates and having a slope of 1. The point sets A4 and A5 are located near to the straight line A3', namely have no great distance from the straight line A3', so that point sets in this coordinate system can be linearly approximated even for various combinations of filter positions of the three colors.

Figure 8:
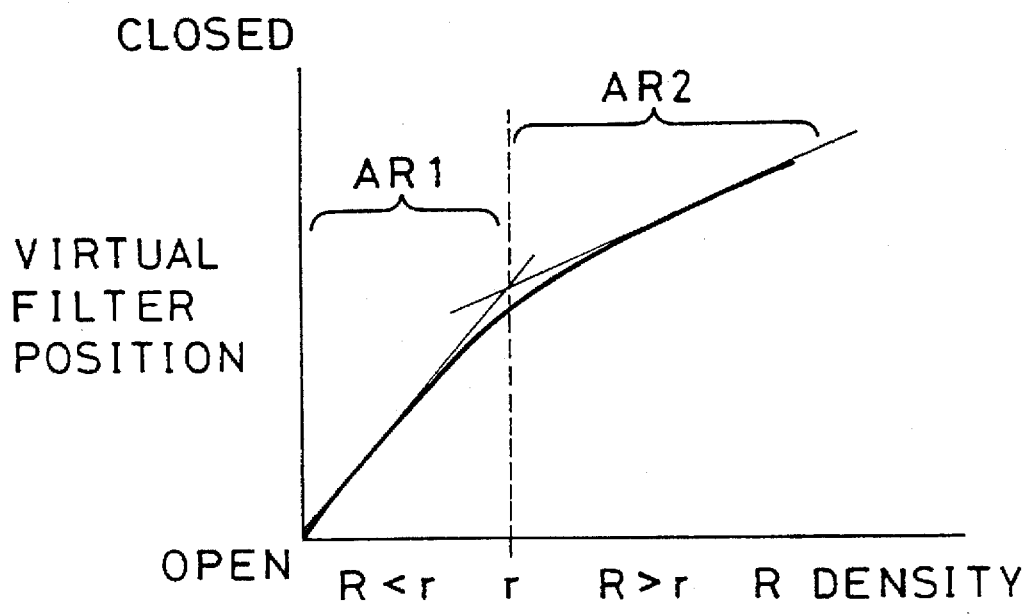
FIG. 8 is a graph illustrating two domains into which the sets of points of the Cyan virtual filter positions are classified for linear approximation.

The Green and Blue density is treated similarly to the Red density. Calibration curves for those colors are used, for conversion into the virtual filter positions P'm and P'y. The conversion is the same as disclosed in U.S. Pat. No. 4,999, 668. Although in U.S. Pat. No. 4,999,668 the collected relationships between the virtual filter positions and the photometric density are treated simply through the regression analysis for the linearizing approximation, the present invention classifies the collected relationships according to grades of each density of Red, Green and Blue by referring to the domains, before the relationships are subjected to the regression analysis for approximation. Matrices for the Equation (1) are respectively obtained in association with the domains. In FIG. 8, there are defined two grades of the Red density by the line R=r dividing the Red density range into sections or domains AR1 and AR2, where portions of the curve are approximated by straight lines.

The matrices as determined are different between the domains. At points on each border between the domains, two or more different results may be created simply by the operation of the matrices, so that there is discontinuity of results of the matrix operation between the domains. To eliminate the discontinuity, the smoothing circuit 53 is connected between the matrix operation arithmetic unit 51 and the driver 52, as illustrated in FIG. 3.

Figure 9:
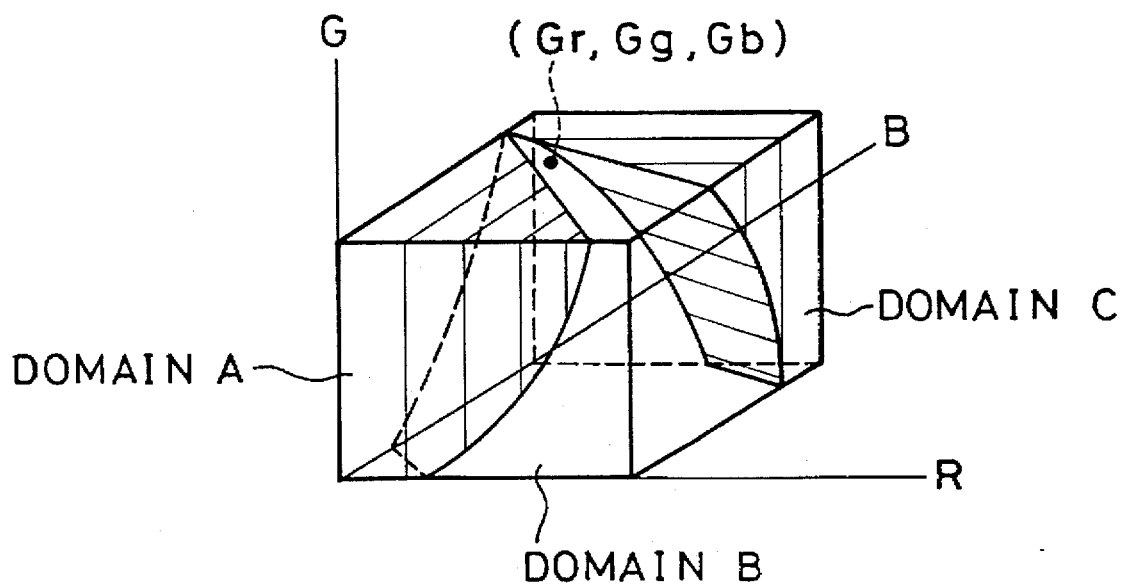
FIG. 9 is an explanatory view illustrating three density domains into which a density space is divided.

The smoothing circuit 53 operates for the smoothing treatment. Let there be three domains A, B and C dividing the density space, as illustrated in FIG. 9. When the photometric density (Gr, Gg, Gb) is located on or near to a border between the domains A, B and C, the photometric density is subjected to matrix operation with three different matrices respectively associated with the domains, so as to obtain three auxiliary virtual set positions. A weighted average of auxiliary set positions is calculated from weights in consideration of distances RA, RB and RC of the virtual filter position (P'c, P'm, P'y) from the respective domains A, B and C. The equations for the calculation of the weighted average are referred to below.

Representative points are defined respectively inside the domains A, B and C. The distances RA, RB and RC are calculated as $$\{(rN-Gr)^2+(gN-Gg)^2+(bN-Gb)^2\}^{1/2}$$

where (Gr, Gg, Gb) is the photometric density for light adjustment, and (rN, gN, bN) is each representative point of the domains A, B and C.

Then factors kA', kB' and kC' are calculated from the following equations:

$$kA'=1/(RA^2+\epsilon)$$

$$kB'=1/(RB^2+\epsilon)$$

$$kC'=1/(RC^2+\epsilon)$$

where $\epsilon$ is a small constant for avoiding impossibility in calculating any of those equations if one of RA, RB and RC is zero.

Weighting coefficients kA, kB and kC (where kA+kB+kC=1) are calculated from the following equations:

$$kA=kA'/(kA'+kB'+kC')$$

$$kB=kB'/(kA'+kB'+kC')$$

$$kC=kC'/(kA'+kB'+kC')$$

Finally the virtual filter position P'c for the Cyan color (as well as P'm and P'y) is calculated from the equation:

$$P'c=kA \cdot P'cA+kB \cdot P'cB+kC \cdot P'cC$$

where P'cA, P'cB and P'cC are Cyan auxiliary set positions, as results of the matrix operation of the photometric density (Gr, Gg, Gb) with the three different matrices respectively associated with the domains A, B and C.

In this way, the results of matrix operation in consideration of the adjacent domains are used in smoothing the virtual filter position. It is possible to eliminate discontinuity regarding the virtual filter position at the borders between the domains, with an advantage for highly precise control for exposure.

Figure 10:
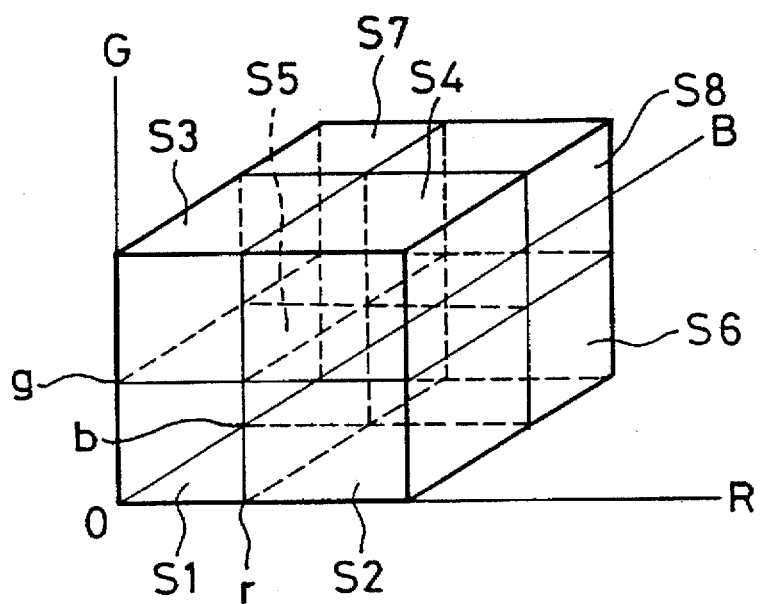
FIG. 10 is an explanatory view illustrating another preferred embodiment having eight density domains.

FIG. 10 illustrates an embodiment where the density space is divided into domains S1 to S8 of rectangular shapes with respect to the planes of R=r, G=g, and B=b. There exists a single point which the eight domains S1 to S8 have in common. There exists a single line which the four domains S1 to S4 have in common, as well as other single lines which other four adjacent domains have in common. There is a problem in selection of near domains among all the domains, due to complexity of calculation. If a different number of domains, for example two or four, should be selected, there might newly occur discontinuity between positions where the number of the selected domains are changed. In view of this, the present embodiment with the eight domains S1 to S8 utilizes all the matrices in the smoothing treatment for any point, no matter how distant it is from the borders. With the eight results of the matrix operation as "auxiliary set positions" obtained, a weighted average is calculated in consideration of distances as weights.

This smoothing treatment for all the points, irrespective of nearness to borders between the domains, is of course applicable to the division of domains A, B and C in FIG. 9, and other division. Operation of the smoothing automatically applies to any point. An effect of the smoothing is strong along or near to the borders. If each of the representative points of the domains is smoothed itself, there does not occur any effect of smoothing, as a distance as a weight is zero. If a smoothed point is near to any of the representative points of the domains, there occur a small effect of smoothing, as a distance as a weight is near to zero.

Operation of the embodiment is now described. In the printing setup mode, matrix elements are determined. At first, the filters 26 to 28 are moved stepwise per 100 pulses and from the fully open position (800 pulses) to the fully closed position (0 pulse). For every combination of setting positions of the filters 26 to 28, average transmittance density of a normal control negative film is measured by the photo receptor 40. As is known in the art, the normal control negative film is a negative film having a circular pattern as a photographic subject. The circular pattern has middle gray color, and is formed as a reference image among various negative images of customers.

The calibration curve A3 is plotted next, for the purpose of conversion of the filter positions to the virtual filter positions P'c, P'm and P'y in linearization. To plot the calibration curve A3, an average transmittance density $\phi(P)$ as DNi of a normal control negative film is measured, with the filters 26 to 28 moved while keeping their filter positions P equal, stepwise in positions of 0, 50, 100, ..., 750, 800 pulses. A set of relationships of the measured density $\phi(P)$ and the filter positions P constitutes the calibration curve A3. Then various values of photometric density R=$\theta$0(Pc) or $\theta$c(Pc), etc. are converted through the calibration curve A3, to obtain data of virtual filter positions P'c, P'm and P'y. Combinations of the virtual filter positions (P'c, P'm, P'y) with the photometric density (R, G, B) are classified in accordance with grades of the photometric density R, G and B, and subjected to the regression analysis which obtains matrix elements in association with respectively classified domains for linearization.

In the printing mode, filter positions where the filters 26 to 28 should be set are determined in accordance with the matrix elements as obtained. At first, a frame of the negative film 20 to be printed is positioned at the mask opening 22 in the film carrier 21. The frame is subjected to photometry performed by the photo receptor 40, while the filters 26 to 28 are set in the open positions. Signals from the sensors 41 to 43 of the photo receptor 40 are converted by the logarithmic converters 46R, 46G and 46B logarithmically, and sent to the controller 50.

The controller 50 determines the gain value by way of the density, and send its data to the matrix operation arithmetic unit 51. Then the controller 50 evaluates the gain value as determined, designates one of the domains to which the gain value belongs, and supplies the matrix operation arithmetic unit 51 with data of matrix elements of the designated domain and of domains adjacent thereto. If a point of density is required to be smoothed, matrix operation take place in plural steps: first for the designated domain with a first matrix, and secondly for the adjacent domains with other matrices (to obtain the auxiliary set positions).

The matrix operation arithmetic unit 51 executes the matrix operation in accordance with Equation (1) on the basis of the photometric density and the matrix elements from the controller 50, to obtain the positions of the filters 26 to 28. Signals of the filter positions are sent to the smoothing circuit 53 and then to the driver 52.

In the smoothing circuit 53, the auxiliary set positions are subjected to calculation with the weights to smooth the filter position, data of which is sent to the driver 52. If the gain value as photometric density is not near to any border between the domains, a distance as weight is near to zero, to have no effect of the smoothing. The driver 52 adjusts the positions of the filters 26 to 28 in response to filter set signals, so as to adjust proportion and intensity of the three colors in fashion optimum to the negative frame to be printed. The shutter 36 is opened for the preset exposure time, so that the frame is printed to the color paper 37 with an optimum light amount. Note that, if a negative frame is remarkably under-exposed or over-exposed, the exposure time is changed. With the exposure time changed with priority, preset equations are used for obtaining filter set positions for setting the filters.

Experiments were conducted to evaluate the effect of the invention. A negative film developed without being exposed was prepared, and was set at the mask opening 22 in the film carrier 21. In the same manner as the printing setup mode, transmittance density of the developed unexposed negative film was measured photometrically. According to grades of the photometric density, the density space was divided into the eight domains as illustrated in FIG. 10. Matrix elements were determined for each of the domains. This is followed by a step different from the printing setup mode. Instead of the photometric density sent from the controller 50, target density of a certain amount was set. By use of the target density, virtual filter positions were determined. The filters 26 to 28 were set in those virtual filter positions, while the transmittance density of the developed unexposed negative film was measured. A difference of the photometric density from the target density was evaluated.

Figure 11:
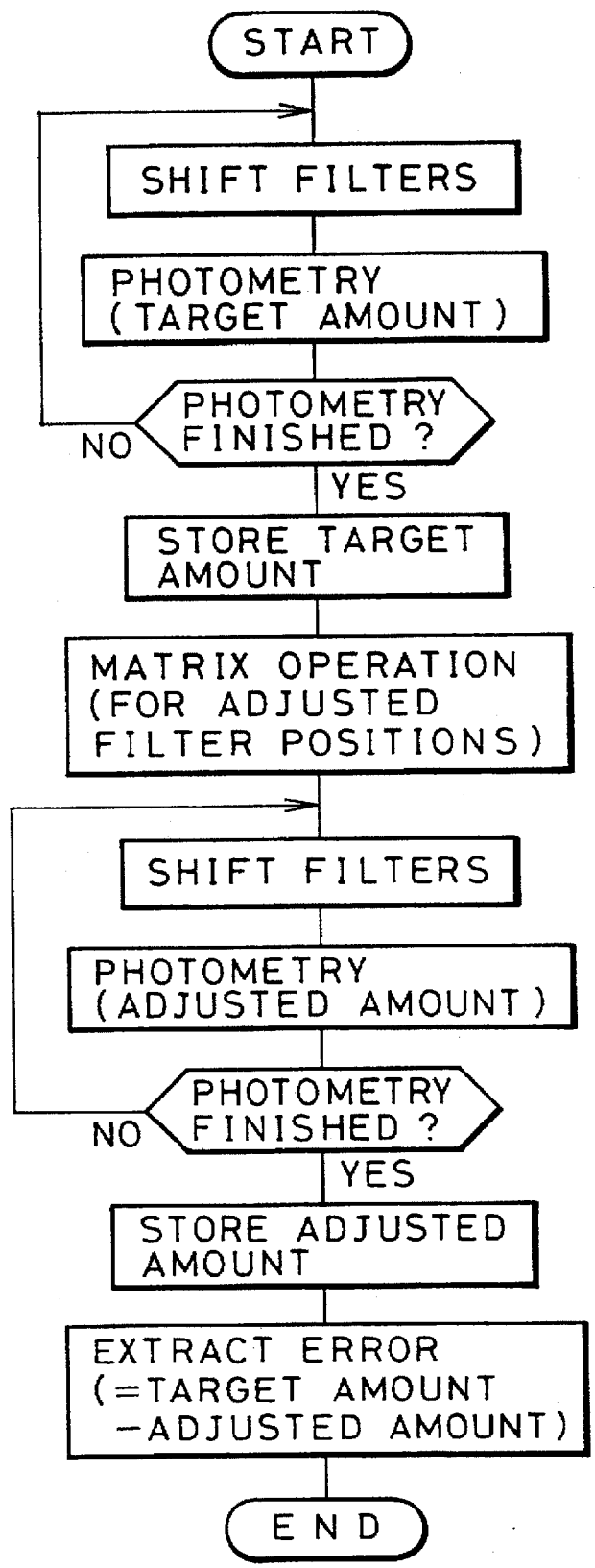
FIG. 11 is a flow chart illustrating steps of experiments to observe the effect of the invention.

Processes in the flow of FIG. 11 were utilized for practicing the method of the present invention and a conventional method, for the comparative evaluation of effects of the present invention. The filters were shifted stepwise in positions of 200, 300, 400, 500, 600 pulses (let 800 pulses represent the fully open state, and let 0 pulse represent the fully closed state). With those positions, the density was photometrically measured, and was defined as a target density. The target density was stored. According to the target density, the matrix operation was executed, to obtain adjusted filter positions. Then the filters were shifted in the stepwise positions the same as the first time of shifting. The density was photometrically measured as an adjusted density. The adjusted density was stored. The adjusted density was subtracted from the target density to extract an error, on the basis of which the light adjustment was evaluated. As a result of the experiments,the error in the adjustment was reduced by the present invention with the plural domains, approximately to a half of errors in the conventional method without use of domains. This shows that the present invention is effective to the rise in precision in light adjustment.

Figure 12:
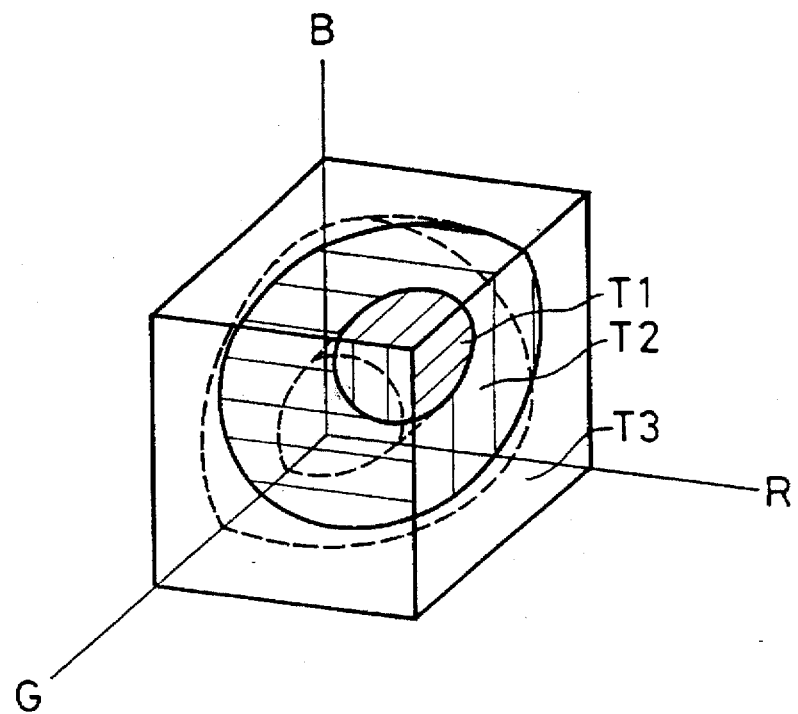
FIG. 12 is an explanatory view illustrating still another preferred embodiment having three density domains among which color balance is different.

In the above embodiment, the density space is divided into the plural domains according to the grades of the photometric density. Alternatively the density space can be divided into domains T1 to T3 according to different manners of the balance in the density between the colors, as illustrated in FIG. 12. In the domain T1, the density of the Red, Green and Blue colors is nearly equal. The relationship between the density and the filter position is near to that of the calibration curve, and thus strongly near to a linear relationship. When the density is deviated between the Red, Green and Blue colors to have an unbalanced color condition, it could not be sufficiently linearized by the calibration curve. Non-linearity lies strongly in the domain T2 and the most strongly in the domain T3. In short, the extent of deviation between the Red, Green and Blue colors is reflected in the division into the domains. The more unbalanced the color density, the greater the number of the domains into which the density space is divided. It is possible easily to raise precision in the exposure control.

In the embodiment of FIG. 10, the density space is divided into eight domains, as the density range of each color is divided into two sections. It is however possible to set a greater or smaller number of domains or sections into which the density space is divided. Domains can be set by dividing the density range of only one or two colors into sections. Domains can be set by dividing the density range of the colors into three or more sections. The more the domains, the higher the precision in determining the filter positions where the filter should be set.

In the embodiments, the filter position, or the printing exposure amount, is determined on the basis of the large area transmittance density (LATD). It is also possible to use a color scanner for measuring respective points within a frame, to obtain a correcting amount of the exposure. The filter position may be determined in accordance with the LATD and the correcting amount.

Figure 13:
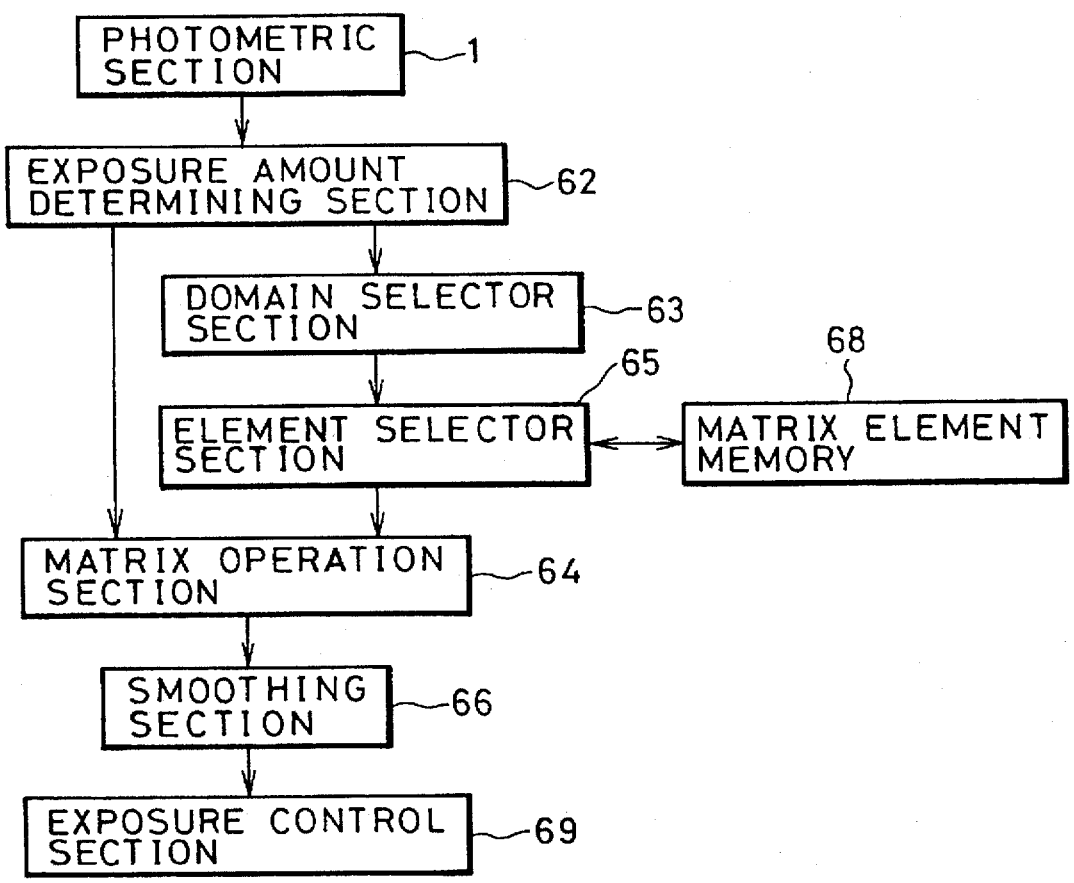
FIG. 13 is a block diagram schematically illustrating another preferred exposure control apparatus, in which a printing exposure amount is treated with a matrix.

In the above embodiments, the density is subjected to the matrix operation, to determine filter positions where the filters should be set. Alternatively a printing exposure amount may be subjected to a matrix operation, for determination of the filter positions. FIG. 13 illustrates a schematic construction in which the correcting amount is used. An exposure amount determining section 62 uses exposure calculating equations known in the art, and determines a printing exposure amount in accordance with optical density of Red, Green and Blue as measured by the photometric section 1. The printing exposure amount is sent to a domain selector section 63 and a matrix operation arithmetic section 64. Referenced by 65 is an element selector section, by 66 is a smoothing section, by 68 is a matrix element memory, and by 69 is an exposure control section.

In the printing mode, the exposure amount determining section 62 in a controller utilizes the exposure calculating equations, and calculates an appropriate exposure amount in accordance with the gain value of the photometric density. The exposure amount is sent to the matrix operation section 64. To determine the positions where to set the filters 26 to 28, the exposure amount, by way of illuminance integrated with respect to time, is used. In the present embodiment, printing exposure time, during which the shutter for the color paper is set open, is determined constant for appropriately exposed negative frames created by a camera. The printing exposure amount corresponds to the gain value as density signal. The element selector section 65, according to the calculated exposure amount, selects a matrix associated with a domain where the exposure amount is located. Data of the selected matrix is sent to the matrix operation section 64.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An exposure control method of a photographic printer comprising the steps of:

defining a three-dimensional density space by photometric density coordinates of three primary colors of a printing light;

dividing said three-dimensional density space into a plurality of density domains; then determining respective matrix elements for each of said plurality of density domains;

obtaining a photometric density of a frame to be printed, said photometric density being separated according to said three primary colors;

selecting one of said plurality of density domains in accordance with said photometric density of said frame to be printed;

selecting said respective matrix elements of said selected one of said plurality of density domains;

executing a matrix operation in accordance with said photometric density of said frame to be printed and with said selected respective matrix elements to determine, for cyan, magenta, and yellow filters, respective positions at which said printing light is optimized; and inserting said filters between said printing light and said frame to be printed on the basis of said respective positions to adjust components of said three primary colors in said printing light.

2. An exposure control method as defined in claim 1, wherein said density domains comprise first to third domains;

said first domain includes a point where density of all said three primary colors in said density space is minimized;

said second domain includes a point where density of all said three primary colors in said density space is maximized; and said third domain is located between said first and second domains in said density space.

3. An exposure control method as defined in claim 1, wherein said density space is divided into first to eighth said domains with reference to first to third substantially plane surfaces, there being a single point that said plane surfaces have in common.

4. An exposure control method as defined in claim 3, wherein said first, second and third plane surfaces are defined as sets of points where density of said first, second and third of said three primary colors is a respective constant fixed between a minimum and a maximum of said density.

5. An exposure control method as defined in claim 1, wherein said density domains comprise first to third domains;

said first domain includes points where density in said density space is equal between said three primary colors;

said second domain includes points where density of a first one of said three primary colors in said density space is maximized, and where density of a second one of said three primary colors in said density space is minimized; and said third domain is located between said first and second domains in said density space.

6. An exposure control method as defined in claim 1, further comprising a step of, in obtaining said filter positions according to said density of said frame, smoothing said filter positions in a vicinity of a border where density domains are adjacent to said selected density domain, to render said filter positions in continued fashion between adjacent said density domains.

7. An exposure control method as defined in claim 6, wherein said smoothing step includes:

executing matrix operation in accordance with said density of said frame and said matrix elements associated with respective said plural density domains, for obtaining auxiliary set positions;

predetermining data of representative points respectively located in said density domains; and calculating a weighted average of said auxiliary set positions in accordance with distances between said density of said frame and said representative points of said density domains, to obtain a point of said smoothed filter positions.

8. An exposure control method as defined in claim 1, further comprising steps of:

measuring said printing light photometrically while said filter positions of said three filters are separately shifted, to obtain first density;

classifying said first density in association with respective said density domains;

associating respective combinations of said filter positions of said filters with said first density and with said density domains associated with said first density; and determining said matrix elements for respective said density domains, through regression analysis in accordance with said first density.

9. An exposure control method as defined in claim 8, further comprising steps of:

measuring said printing light photometrically while said three filters are shifted in a common filter position common to said three filters, to obtain second density;

plotting points having coordinates of said second density and said common filter position in a coordinate system, to produce a calibration curve; and converting said first density into a virtual filter position by use of said calibration curve, said virtual filter position classified in combination with said first density, and said matrix elements obtained in combination with said virtual filter position and said first density through said regression analysis.

10. An exposure control method as defined in claim 1, wherein said density has form of a gain value; and further comprising a step of determining said density of said gain value form from Di, DNi and Bi in accordance with arithmetic operation and conversion to a linear area, wherein Di is said density of said frame, DNi is density obtained by measuring a normal control negative film, Bi is a filter position where said normal control negative film is finished in optimum fashion, and i is each of said three primary colors.

11. An exposure control method as defined in claim 10, wherein said DNi is obtained by measuring said normal control negative film photometrically while said three filters are shifted in a common filter position common to said three filters;

further comprising steps of:

plotting points having coordinates of said DNi and said common filter position in a coordinate system, to produce a calibration curve; and converting said Di and DNi into forms in said linear area as positions of said filters by use of said calibration curve, said forms used for determining said density of said gain value form.

12. An exposure control apparatus for a photographic printer, said photographic printer having a light source and yellow, magenta, and cyan color-correcting filters which are inserted in between said light source and a frame of developed photographic film, said photographic printer also having a controller for setting said color-correcting filters in respective filter positions to adjust three-color components of printing light from said light source, said photographic printer printing said frame on photosensitive material, said exposure control apparatus comprising:

a photometric section for measuring a frame to be printed photometrically in three-color separation, to obtain a photometric density thereof for three primary colors;

a domain selector section, provided with said photometric density of said frame, for generating a signal representing one density domain in response to said density of said frame, wherein said one density domain is selected from a plurality of preset density domains that divide a three-dimensional density space, and wherein said density space is defined by coordinates at which respective photometric densities of said three primary colors has been taken;

a matrix element memory for storing data of matrix elements, said memory having addresses corresponding to said plurality of density domains, each of said plurality of density domains having respective ones of said matrix elements;

an element selector section, provided with said signal representing said one density domain, for accessing said matrix element memory at one of said addresses that corresponds to said one density domain, to identify selected ones of said matrix elements corresponding to said respective matrix elements of said one density domain; and a matrix operation section for executing a matrix operation in accordance with said photometric density of said frame and with said selected ones of said matrix elements, to obtain said respective filter positions at which said printing light is optimized.

13. An exposure control apparatus as defined in claim 12, wherein said density domains comprise first to third domains;

said first domain includes a point where density of all said three primary colors in said density space is minimized;

said second domain includes a point where density of all said three primary colors in said density space is maximized; and said third domain is located between said first and second domains in said density space.

14. An exposure control apparatus as defined in claim 12, wherein said density space is divided into first to eighth said domains with reference to first to third substantially plane surfaces, there being a single point that said plane surfaces have in common.

15. An exposure control apparatus as defined in claim 14, wherein said first, second and third plane surfaces are defined as sets of points where density of said first, second and third of said three primary colors is a respective constant fixed between a minimum and a maximum of said density.

16. An exposure control apparatus as defined in claim 12, wherein said density domains comprise first to third domains;

said first domain includes points where density in said density space is equal between said three primary colors;

said second domain includes points where density of a first one of said three primary colors in said density space is maximized, and where density of a second one of said three primary colors in said density space is minimized; and said third domain is located between said first and second domains in said density space.

17. An exposure control apparatus as defined in claim 12, further comprising a smoothing section for smoothing said filter positions obtained from said matrix operation section, in a vicinity of a border where density domains are adjacent to said selected density domain, to render said filter positions in continued fashion between adjacent said density domains.

18. An exposure control apparatus as defined in claim 17, wherein said matrix operation section executes matrix operation in accordance with said density of said frame and said matrix elements associated with respective said plural density domains, for obtaining auxiliary set positions; and said smoothing section pre-stores data of representative points respectively located in said density domains, and calculates a weighted average of said auxiliary set positions in accordance with distances between said density of said frame and said representative points of said density domains, to obtain a point of said smoothed filter positions.

19. An exposure control apparatus as defined in claim 12, further comprising:

a filter drive section for driving said three filters, to set said three filters in respective said filter positions;

said photometric section measuring said printing light photometrically while said filter drive section shifts said three filters separately, to obtain first density;

said domain selector section classifying said first density in association with respective said density domains;

a density memory, connected to said filter drive section and said domain selector section, for storing said first density and said density domains associated with said first density, in association with respective combinations of said filter positions of said filters; and a matrix element determining section, for accessing said density memory, to determine said matrix elements for respective said density domains, through regression analysis in accordance with said first density.

20. An exposure control apparatus as defined in claim 19, wherein said photometric section further measures said printing light photometrically while said filter drive section shifts said three filters in a common filter position common to said three filters, to obtain second density;

said density memory further stores said second density from said photometric section in association with said common filter position; and said matrix element determining section plots points having coordinates of said second density and said common filter position in a coordinate system, to produce a calibration curve; converts said first density into a virtual filter position by use of said calibration curve; and classifies said virtual filter position in combination with said first density, said matrix elements obtained in combination with said virtual filter position and said first density through said regression analysis.

21. An exposure control apparatus as defined in claim 12, wherein said density has form of a gain value; and said matrix operation section further determines said density of said gain value form from Di, DNi and Bi in accordance with arithmetic operation and conversion to a linear area, wherein Di is said density of said frame, DNi is density obtained at said photometric section by measuring a normal control negative film, Bi is a filter position where said normal control negative film is finished in optimum fashion, and i is each of said three primary colors.

22. An exposure control apparatus as defined in claim 21, further comprising:

a filter drive section for driving said three filters, to set said three filters in respective said filter positions;

said photometric section measuring said normal control negative film photometrically while said filter drive section shifts said three filters in a common filter position common to said three filters, to obtain said DNi as density;

a density memory for storing said DNi from said photometric section in association with said common filter position; and a curve plotter section, for accessing said density memory, to plot points having coordinates of said DNi and said common filter position in a coordinate system, to produce a calibration curve;

said matrix operation section converting said Di and DNi into forms in said linear area as positions of said filters by use of said calibration curve, said forms used for determining said density of said gain value form.

23. An exposure control method of a photographic printer comprising the steps of:

defining a three-dimensional density space by exposure amount coordinates of three primary colors of a printing light;

dividing said three-dimensional exposure amount space into a plurality of exposure amount domains;

determining respective matrix elements for each of said plurality of exposure amount domains;

obtaining an exposure amount of a frame to be printed, said exposure amount being calculated from a result of photometrically measuring, in three-color separation, said frame to be printed;

selecting one of said plurality of exposure amount domains in accordance with said exposure amount of said frame to be printed;

selecting said respective matrix elements of said selected one of said plurality of exposure amount domains;

executing a matrix operation in accordance with said exposure amount of said frame to be printed and with said selected respective matrix elements to determine, for cyan, magenta, and yellow filters, respective positions at which said printing light is optimized; and inserting said filters between said printing light and said frame to be printed on the basis of said respective positions to adjust components of said three primary colors in said printing light.

* * * * *